United States Patent
Van De Wiele, Jr.

(10) Patent No.: US 7,186,917 B1
(45) Date of Patent: Mar. 6, 2007

(54) DISPOSABLE WALL BOX PAINTING MASK

(76) Inventor: Charles E. Van De Wiele, Jr., 2015 E. 52nd St., Tulsa, OK (US) 74105

( * ) Notice: Subject to any disclaimer, the term of this patent is extended or adjusted under 35 U.S.C. 154(b) by 0 days.

(21) Appl. No.: 10/903,733

(22) Filed: Jul. 30, 2004

(51) Int. Cl.
*H05K 5/03* (2006.01)

(52) U.S. Cl. .......................... 174/66; 174/67; 220/241; 33/528

(58) Field of Classification Search ................ 174/66, 174/67; 220/241, 242; 33/528
See application file for complete search history.

(56) References Cited

U.S. PATENT DOCUMENTS

| | | | |
|---|---|---|---|
| 5,285,014 A | 2/1994 | Gilchrist | |
| 5,375,728 A | 12/1994 | West | |
| 5,441,769 A * | 8/1995 | Ross et al. | 427/282 |
| 5,525,755 A | 6/1996 | Christensen | |
| 5,723,816 A * | 3/1998 | Neece | 174/66 |
| 6,103,974 A | 8/2000 | Erdfarb | |
| 6,664,471 B1 | 12/2003 | Howe, Jr. | |
| 6,703,562 B1 | 3/2004 | Pacheco | |
| 6,803,522 B2 * | 10/2004 | Skakun | 174/66 |
| 2003/0056968 A1 | 3/2003 | Skakun | |
| 2004/0065466 A1 | 4/2004 | Compagnone, Jr. | |

* cited by examiner

Primary Examiner—Dhiru R. Patel
(74) Attorney, Agent, or Firm—Frank J. Catalano

(57) ABSTRACT

A mask for use during painting shields those components of the contents of a wall box which will be exposed through a decorative plate used to cover the wall box after the wall is painted. The mask is a substantially flat thin sheet with an adhesive substance applied to its face along its outer perimeter for adhering the sheet to the wall. The substance may be continuous or may be spotted about the perimeter. A pad of identical masks can be temporarily held in stacked laminar relationship by the adhesive substance. The mask may also have a raised portion of perimeter, depth and location suitable for shielding any of the contents of the box which protrude from the box beyond the plane of wall surface. The raised portions may be tapered to facilitate nesting of identical masks in a pad temporarily held in stacked laminar relationship by the adhesive substance.

4 Claims, 6 Drawing Sheets

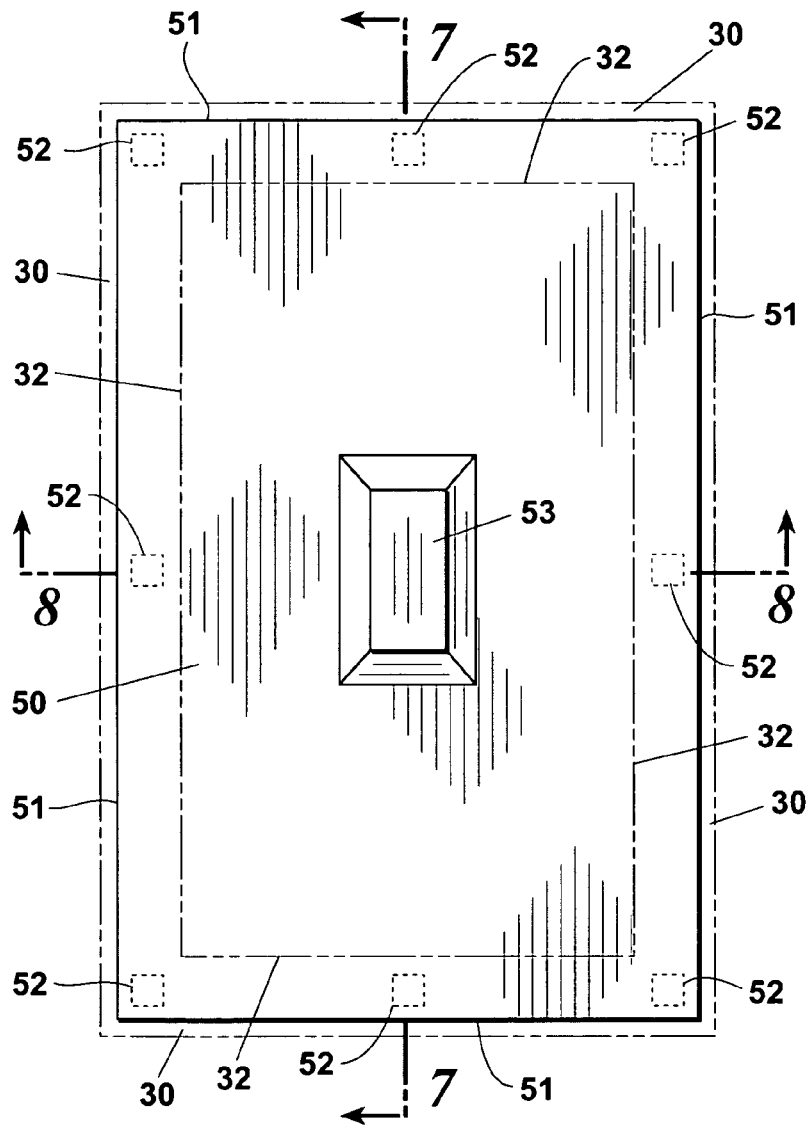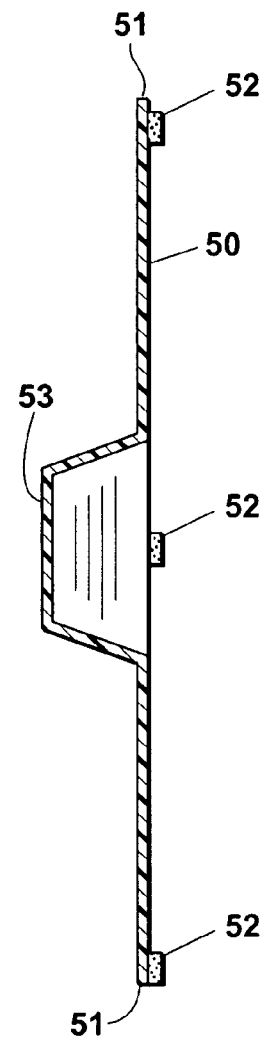
Fig. 6
Fig. 7
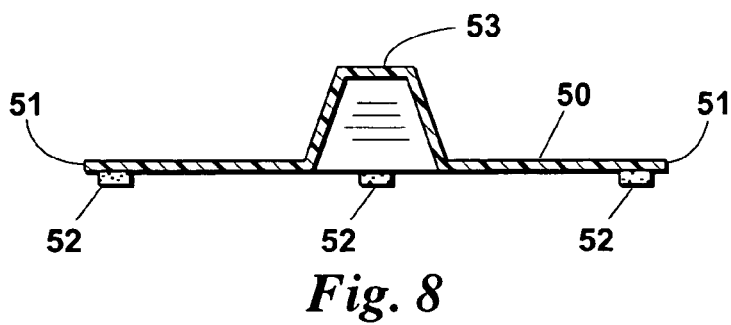
Fig. 8

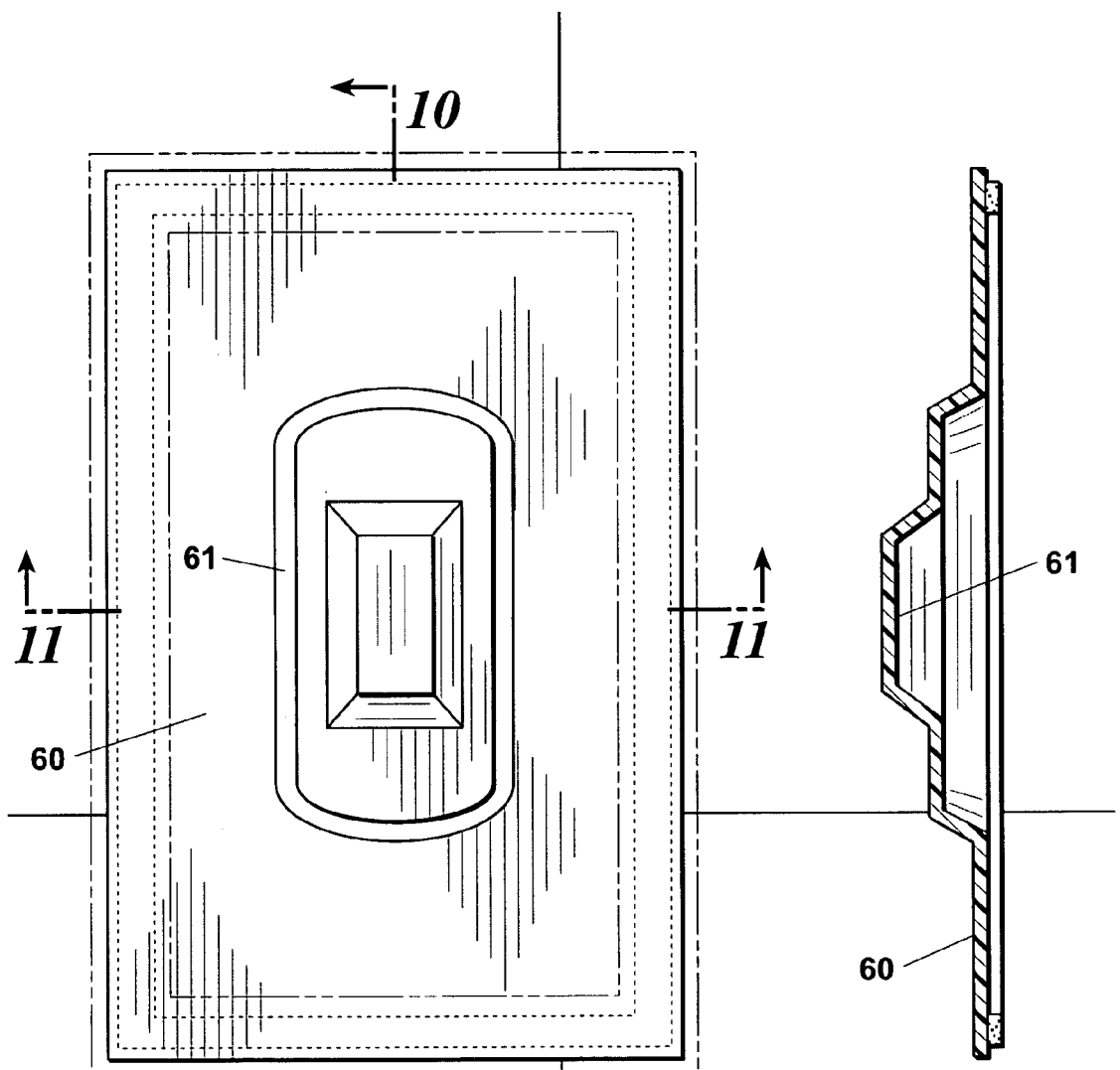
*Fig. 9*
*Fig. 10*
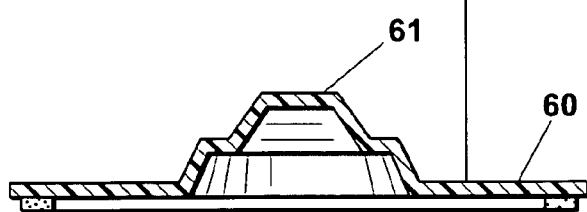
*Fig. 11*

DISPOSABLE WALL BOX PAINTING MASK

BACKGROUND OF THE INVENTION

This invention relates generally to wall preparation and treatment equipment and more particularly concerns a disposable mask for shielding a wall box and its contents while a wall is being plastered, primed, painted or the like. In the disclosure that follows, the invention will be discussed in relation to the painting process, but it is also applicable to other wall preparation and treatment processes.

In preparing a wall for plastering, priming or painting, when switches, receptacles, phone jacks or other contents have already been mounted in their respective wall boxes, it is common practice to either cover the open box with protective tape or to cover the box with its decorative plate and to then apply protective tape to the cover. Accurate taping is a tedious, time-consuming task.

Many types of shields have been designed for use in lieu of tape to cover the boxes or decorative plates. Those shields that cover the plates do not truly solve the problem. It is impossible to completely cover the plate without also covering a thin perimeter on the wall around the plate, leaving this portion of the wall unpainted. On the other hand, if the plate is not covered to its extremities, paint will be applied to the plate extremities. Those shields that cover the open box and its contents suffer from a variety of shortcomings. Some have relatively complex three-dimensional shapes and are, therefore, clumsy, unstackable and generally too expensive to be disposable. They are mounted either by use of the screws intended to secure the decorative plate to the box or by use of rearwardly protruding mechanisms such as prongs to be inserted into the slots in a receptacle or leaf-spring-like tabs that engage against the inner walls of the box. Use of the screws is, of course, further time consuming and also sometimes results in loss of the screws before the decorative plate is applied. The complex mounting mechanisms make the shields even more unnecessarily expensive and less disposable. Since all of these shields are mounted by connection to the box or to its contents, the connection points are considerably inward of the outer perimeter of the shield. Consequently, the perimeter of the shield is not always held in abutment with the wall, especially if the wall is not perfectly planar, and paint can seep between the shield and the wall. If the paint fully dries before the shield is removed, added effort may be required to assure that paint is not stripped from areas intended to be painted during removal of the shield.

It is, therefore, an object of this invention to provide a wall box painting mask which shields an open wall box and its contents during wall painting. Another object of this invention is to provide a wall box painting mask which connects proximate its outer perimeter to the wall surrounding its wall box. A further object of this invention is to provide a wall box painting mask which has an outer perimeter which surrounds the outer perimeter of the wall box but lies within the anticipated outer perimeter of the wall box decorative cover. Yet another object of this invention is to provide a wall box painting mask which is disposable. It is also an object of this invention to provide a wall box painting mask which is relatively thin and pliable. Still another object of this invention is to provide a wall box painting mask which is contoured to be stackable in a pad of many identical masks. An additional object of this invention is to provide a wall box painting mask which is secured to the wall by use of adhesive on the rear outer perimeter of the mask. Another object of this invention is to provide a wall box painting mask which is held in a stacked pad relationship by the adhesive which will secure each pad to the wall. A further object of this invention is to provide a wall box painting mask which does not connect directly to the wall box or its contents. Yet another object of this invention is to provide a wall box painting mask which connects directly to the wall surrounding the wall box. It is also an object of this invention to provide a wall box painting mask which requires no tools for attachment. Still another object of this invention is to provide a wall box painting mask which requires no separate components for attachment.

SUMMARY OF THE INVENTION

In accordance with the invention, a mask is provided for shielding the contents of a wall box during wall painting. Particularly, the mask is used to shield those components of the box contents which will be exposed through a decorative plate used to cover the wall box after the wall is painted.

In one embodiment, the mask is a substantially flat thin sheet which has an outer perimeter of minimum geometric dimensions great enough to completely overlay a perimeter of an opening in the wall surrounding the box and of maximum geometric dimensions small enough to completely lie within a perimeter of the decorative plate when the plate has been located to cover the wall box. An adhesive substance or material is applied or fixed to a face of the sheet along its outer perimeter for adhering a portion of the face of the sheet to the wall. The substance or material is preferably limited to the area between the sheet outer perimeter and the perimeter of the decorative cover as imaged on the sheet. The substance or material may be continuous about the perimeter or may be spotted about the perimeter. The adhesive quality of the substance or material may be chosen in a range from barely holding the sheet in place on the wall to barely being peelable from the wall without use of tools or solvents. The quality of adhesiveness may be selected to facilitate formation of a pad of identical masks temporarily held in stacked laminar relationship by the adhesive substance or material.

In another embodiment, the mask may also have a raised portion of perimeter, depth and location suitable for shielding any portions of the contents of the box which might protrude from the box beyond the plane of wall surface. Furthermore, the raised portions may be tapered to facilitate nesting of identical masks to form a pad of such masks temporarily held in stacked laminar relationship by the adhesive substance or material.

BRIEF DESCRIPTION OF THE DRAWINGS

Other objects and advantages of the invention will become apparent upon reading the following detailed description and upon reference to the drawings in which:

FIG. 6 is a front elevation view of a mask for shielding the contents of the toggle switch wall box illustrated in FIG. 2;

FIG. 7 is a cross-sectional view taken along the line 7—7 of FIG. 6;

FIG. 8 is a cross-sectional view taken along the line 8—8 of FIG. 6;

FIG. 9 is a front elevation view of a mask for shielding the contents of either the receptacle wall box illustrated in FIG. 1 or the toggle switch wall box illustrated in FIG. 2;

FIG. 10 is a cross-sectional view taken along the line 10—10 of FIG. 9;

FIG. 11 is a cross-sectional view taken along the line 11—11 of FIG. 9;

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Figure 1:
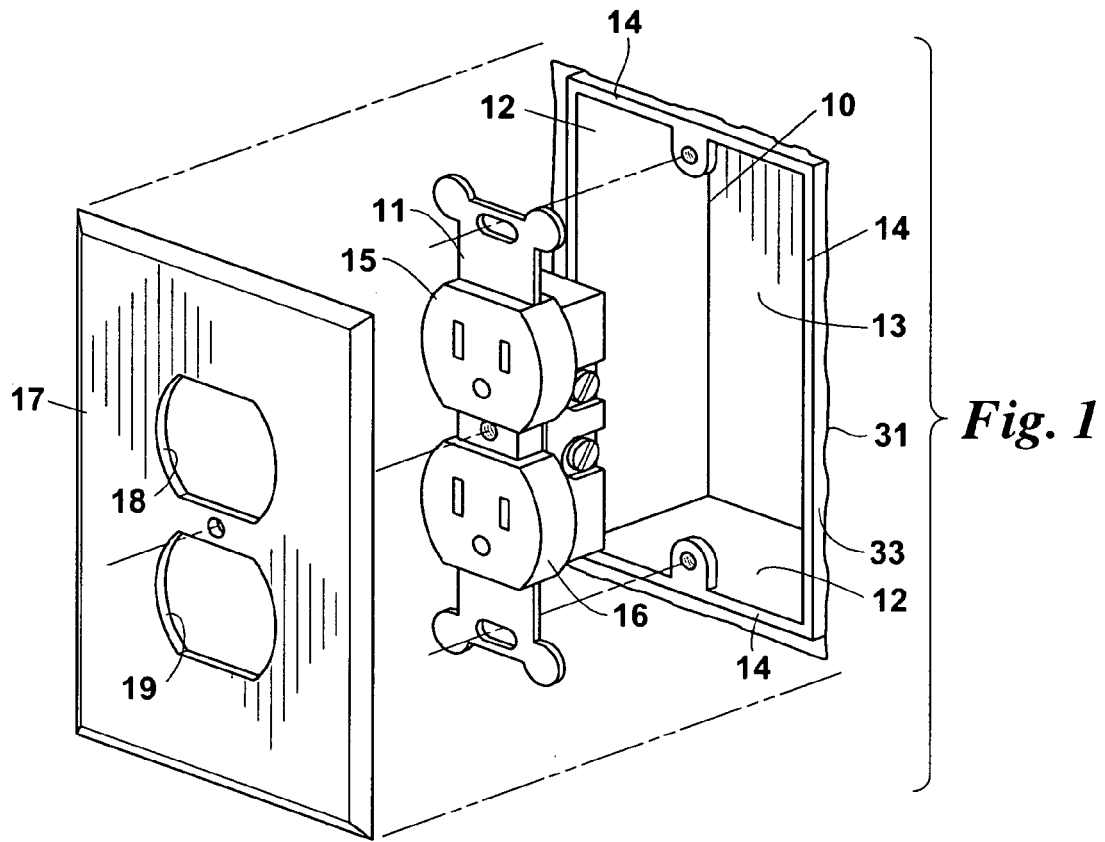
FIG. 1 is a perspective assembly view of a typical electrical power outlet, decorative cover plate and wall box.
Figure 2:
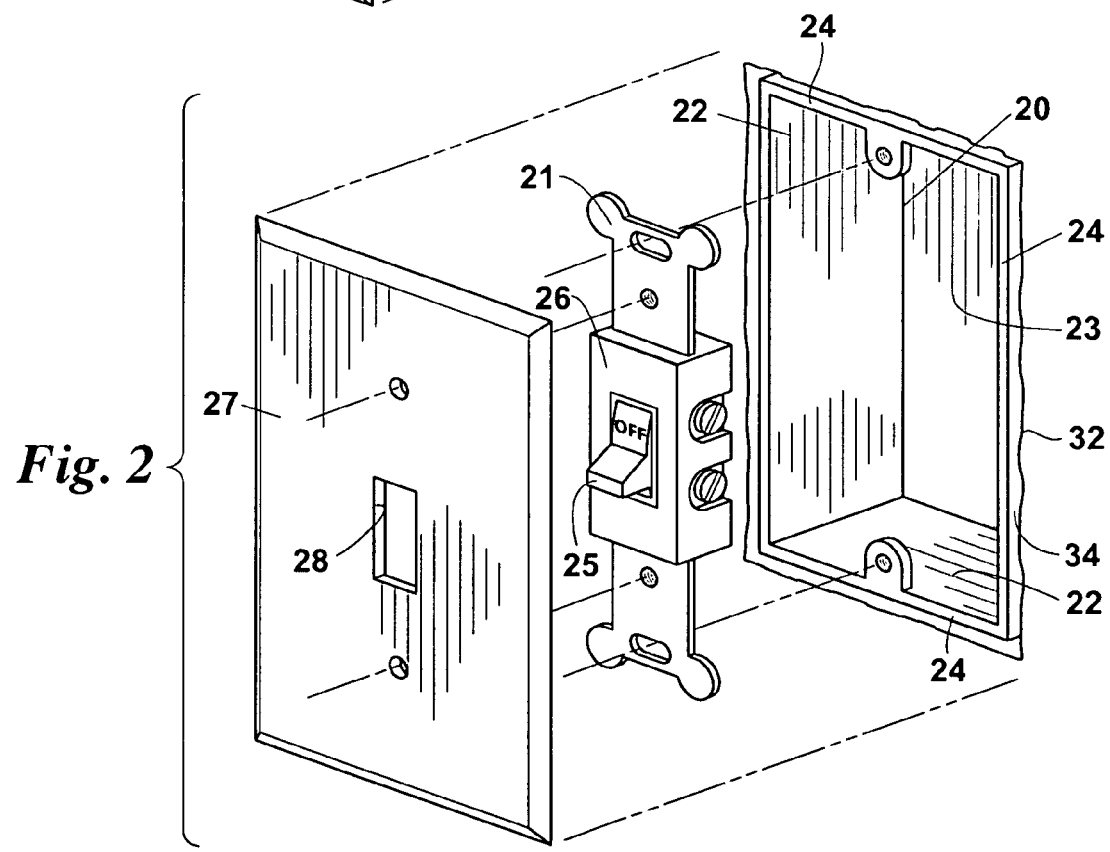
FIG. 2 is a perspective assembly view of a typical toggle switch, decorative cover plate and wall box.
Figure 3:
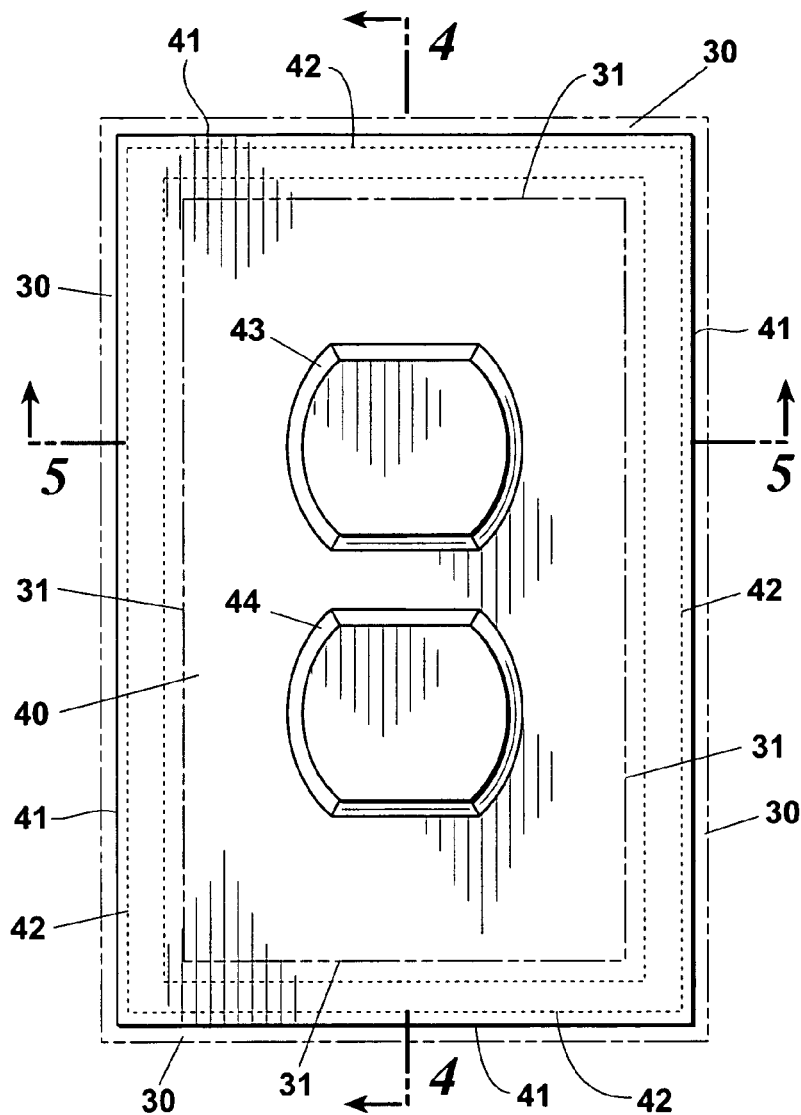
FIG. 3 is a front elevation view of a mask for shielding the contents of the receptacle wall box illustrated in FIG. 1.

Turning first to FIGS. 1 and 2, open wall boxes 10 and 20, one to contain a typical electrical outlet 11 and the other to contain a typical toggle switch 21, respectively, are illustrated mounted in portions of a wall 30 to be painted. The boxes 10 and 20 have four side walls 12 and 22 and a back wall 13 and 23, respectively. The forward edges 14 and 24 of the side walls 13 and 23 of each box 10 and 20 lie in a single plane. If the boxes 10 and 20 are properly aligned in openings 31 and 32 cut into the wall 30, the planes formed by their forward edges 14 and 24 will be coplanar with the outer surface of the wall 30. Usually, there is a minimal gap 33 and 34 between the perimeter of each box 10 and 20 and the perimeter of the wall openings 31 and 32.

When the outlet 11 is mounted in the box 10, the forward portions of the receptacles 15 and 16 will protrude forwardly of the box 10. When the decorative plate 17 which will cover the box 10 is in place, the forward portions of the receptacles 15 and 16 will be exposed through the openings 18 and 19 in the plate 17. The outer perimeter of the plate 17 overlaps the perimeter of the wall opening 31 to provide an area 35 on the surface of the wall 30 between the perimeter of the wall opening 31 and the perimeter of the plate 17.

Similarly, when the switch 21 is mounted in the box 20, the lever 25 and the boss 26 around the lever 25 will protrude forwardly of the box 20. When the decorative plate 27 which will cover the box 20 is in place, the lever 25 and boss 26 will be exposed through the opening 28 in the plate 27. The outer perimeter of the plate 27 overlaps the perimeter of the wall opening 32 to provide an area 36 on the surface of the wall 30 between the perimeter of the wall opening 32 and the perimeter of the plate 27.

In painting the wall 30, it is desirable to shield the protruding portions of the receptacles 15 and 16, the lever 25 and the boss 26 but to leave the outer portions of the wall areas 35 and 36 within the perimeters of the plates 17 and 27 exposed to receive paint. While this objective has been explained in relation to painting a wall with boxes 10 and 20 for an outlet 11 and a switch 21, it is applicable to any contents of a wall box, including for example telephone jacks and rheostats, which are to be shielded from paint, primer, plaster or the like.

Figure 4:
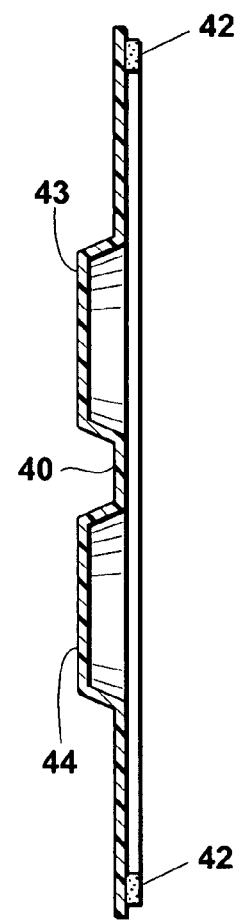
FIG. 4 is a cross-sectional view taken along the line 4—4 of FIG. 3.
Figure 5:
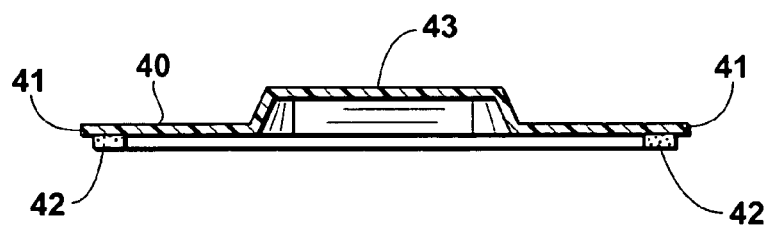
FIG. 5 is a cross-sectional view taken along the line 5—5 of FIG. 3.

Looking at FIGS. 1, 3–5 and 14, a mask 40 for shielding the contents of the electrical power outlet box 10 of FIG. 1 is illustrated. The mask 40 is formed from a thin sheet of plastic such as polyvinyl chloride in the order of less than 1 mil thick. The geometric dimensions of the outer perimeter 41 of the mask 40 are, at a minimum, great enough to completely overlay the perimeter of the wall box wall opening 31. The geometric dimensions of the outer perimeter 41 of the mask 40 are also, at a maximum, small enough to completely lie within the perimeter of the decorative plate 17. Thus, when the mask 40 is placed over the wall box 10, the perimeter of the rear face of the mask 40 as defined by these minimum and maximum dimensions can be aligned to abut the wall area 35 around the box 10, but only within the anticipated location of the perimeter of the decorative plate 17 when it is fixed in place over the wall box 10 and outlet 11. As shown, adhesive 42 may be disposed along the entire perimeter of this abutting area between the wall 30 and the mask 40 to adhere the rear face of the mask 40 to the wall 30. Alternatively, the adhesive may be spotted at intervals along the same area, as is hereafter illustrated in relation to the toggle switch box 20. The adhesive 42 may be applied to the mask 40 in the form of double-backed adhesive tape or in liquid form similar to the adhesive coating used for stick-on note pads. As best seen in FIGS. 4 and 5, the mask 40 has raised portions 43 and 44 of perimeter, depth and location suitable for receiving the protruding forward portions of the receptacles 15 and 16, respectively. The raised portions 43 and 44 assure that the mask 40 can abut the wall 30 without exertion of any separating force by the contents of the box 10 against the rear face of the mask 40.

Looking at FIGS. 2, 6–8 and 15, a mask 50 for shielding the contents of the toggle switch box 20 of FIG. 2 is illustrated. The mask 50 is formed from a thin sheet of plastic such as polyvinyl chloride in the order of less than 1 mil thick. The geometric dimensions of the outer perimeter 51 of the mask 50 are, at a minimum, great enough to completely overlay the perimeter of the wall box wall opening 32. The geometric dimensions of the outer perimeter 51 of the mask 50 are also, at a maximum, small enough to completely lie within the perimeter of the decorative plate 27. Thus, when the mask 50 is placed over the wall box 20, the perimeter of the rear face of the mask 50 as defined by these minimum and maximum dimensions can be aligned to abut the wall area 36 around the box 20, but only within the anticipated location of the perimeter of the decorative plate 27 when it is fixed in place over the wall box 20 and switch 21. As earlier illustrated in relation to the power outlet wall box 20, adhesive may be disposed along the entire perimeter of this abutting area between the wall 30 and the mask 50 to adhere the rear face of the mask 50 to the wall 50. Alternatively, and as shown, the adhesive 52 may be spotted at intervals along the same area. The adhesive 52 may be applied to the mask 50 in the form of double-backed adhesive tape or in liquid form similar to the adhesive coating used for stick-on note pads. As best seen in FIGS. 7 and 8, the mask 50 has a raised portion 53 of perimeter, depth and location suitable for receiving the protruding forward portions of the lever 25 and the boss 26 of the switch 21. The raised portion 53 assures that the mask 50 can abut the wall 30 without exertion of any separating force by the contents of the box 20 against the rear face of the mask 50.

Looking at FIGS. 9–11, a composite mask 60 for shielding the contents of either the power outlet box 10 of FIG. 1 or the toggle switch box 20 of FIG. 2 is illustrated. The mask 60 is similar in all respects to the masks 40 and 50 illustrated in FIGS. 3 and 6, respectively, except that, as best seen in FIGS. 10 and 11, the mask 60 has a raised portion 61 of perimeter, depth and location suitable for receiving the protruding forward portions of both the receptacles 15 and 16 of the outlet 11 and the lever 25 and the boss 26 of the switch 21. The raised portion 61 assures that the mask 60 can abut the wall 30 without exertion of any separating force by the contents of either box 10 or 20 against the rear face of the mask 60.

Figure 12:
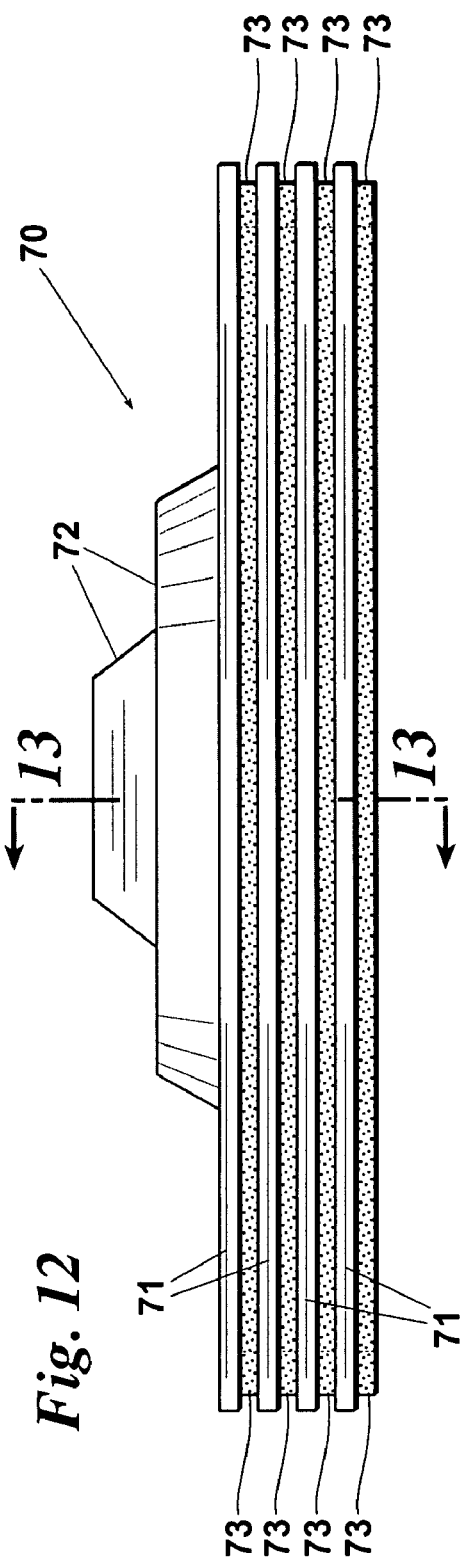
FIG. 12 is a side elevation view of a pad of masks identical to the mask illustrated in FIG. 9.
Figure 13:
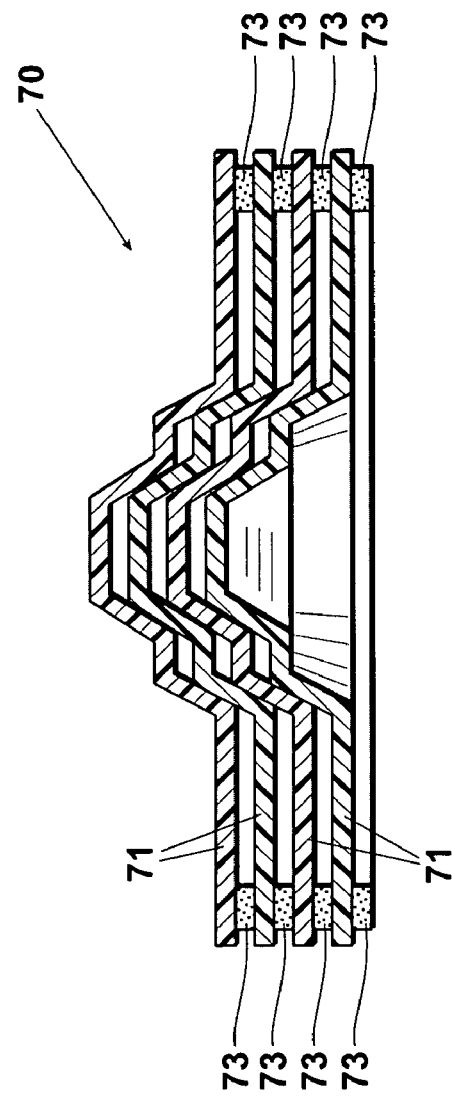
FIG. 13 is a cross-sectional view taken along the line 13—13 of FIG. 12.
Figure 15:
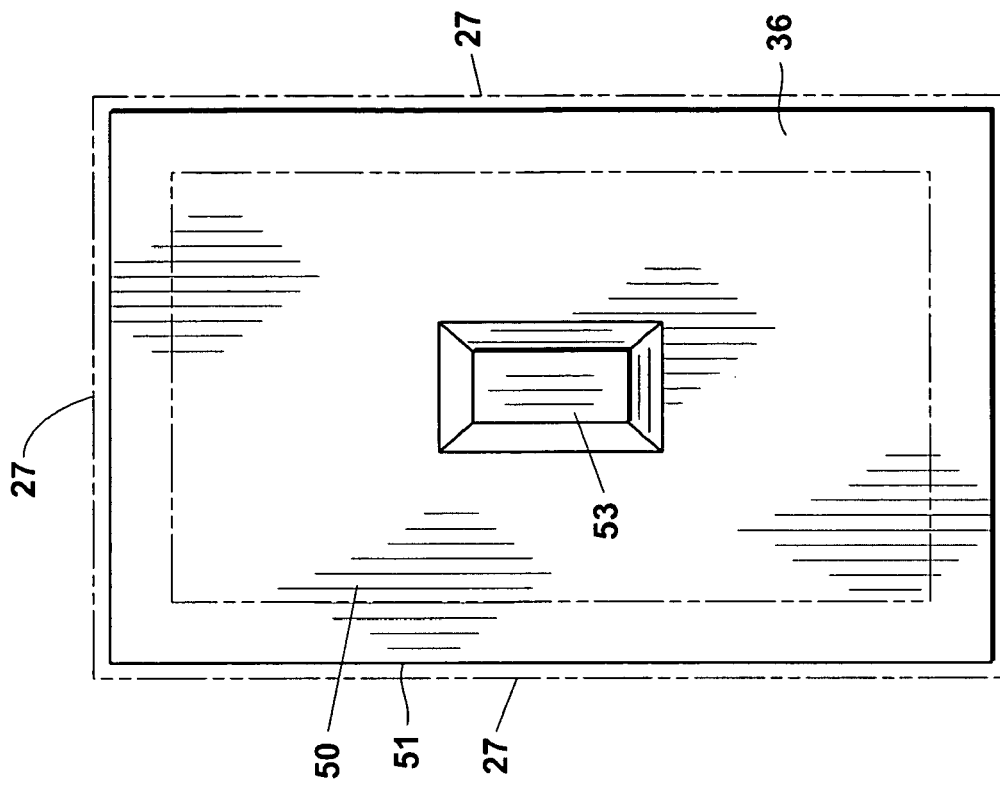
FIG. 15 is a front elevation view of the mask of FIG. 6 shielding the contents of the toggle switch wall box illustrated in FIG. 2.
Figure 14:
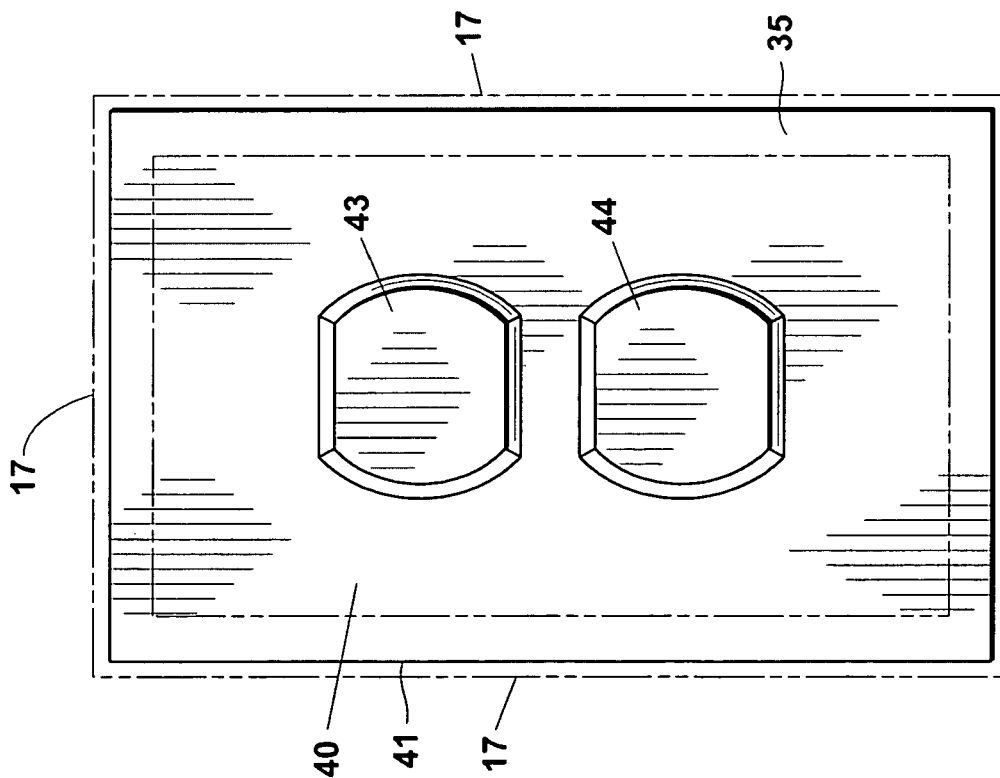
FIG. 14 is a front elevation view of the mask of FIG. 3 shielding the contents of the receptacle wall box illustrated in FIG. 1.

Turning now to FIGS. 12 and 13, a pad 70 is formed by stacking a plurality of identical masks 71 in laminar relationship. By way of example, and as shown, the masks 71 are identical to the composite masks 60 illustrated in FIGS. 9–11. The pad 70, however, may be formed from masks 71 of any configuration provided they are tapered rearwardly to permit nesting of their raised portions 73 in the laminar relationship. The adhesive 73 may be located on and applied to the each of the stacked masks 71 as described with respect to the masks 40 and 50 of FIGS. 3 and 6. The adhesive 73 thus serves the additional purpose of temporarily holding the masks 70 in their stacked laminar relationship until they are individually peeled off the pad 70 for use.

The invention has been described in relation to masks 40, 50 and 60 which may be used to shield a dual receptacle outlet 11, a single toggle switch 21 or a composite thereof. The principles of the invention are also applicable to any other configuration suitable to cover the contents of any typical box and contents or composites thereof, including, for example, quad-receptacle outlets, multiple toggle switches, dimmer switches, telephone jacks, and the like, whether in stacked relationship or not.

Thus, it is apparent that there has been provided, in accordance with the invention, a disposable wall box painting mask that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For shielding during wall painting the contents of an electrical wall box which will be exposed through a decorative plate used to cover the wall box after the wall is painted, a mask comprising a substantially flat thin sheet having an outer perimeter of minimum geometric dimensions great enough to completely overlay a perimeter of an opening in the wall surrounding the box and of maximum geometric dimensions small enough to completely lie within a perimeter of the decorative plate when the plate has been located to cover the wall box and means fixed to a face of said sheet along said outer perimeter for adhering a portion of said face of said sheet to the wall.

2. For shielding during wall painting the contents of electrical wall boxes which will be exposed through decorative plates used to cover the wall boxes after the walls are painted, a pad comprising a plurality of identical masks, each mask comprising a substantially flat thin sheet having an outer perimeter of minimum geometric dimensions great enough to completely overlay a perimeter of an opening in the wall surrounding the box and of maximum geometric dimensions small enough to completely lie within a perimeter of the decorative plate when the plate has been located to cover the wall box and means fixed to a face of said sheet along said outer perimeter for adhering a portion of said face of said sheet to the wall, said masks being temporarily held in stacked laminar relationship by said adhering means.

3. For shielding during wall painting the contents of an electrical wall box which will be exposed through a decorative plate used to cover the wall box after the wall is painted, a mask comprising a substantially flat thin sheet having an outer perimeter of minimum geometric dimensions great enough to completely overlay a perimeter of an opening in the wall surrounding the box and of maximum geometric dimensions small enough to completely lie within a perimeter of the decorative plate when the plate has been located to cover the wall box and a raised portion of perimeter, depth and location suitable for receiving therein portions of the contents of the box which protrude from the box beyond a plane of a surface of the wall and means fixed to a face of said sheet along said outer perimeter for adhering a portion of said face of said sheet to the wall.

4. For shielding during wall painting the contents of electrical wall boxes which will be exposed through decorative plates used to cover the wall boxes after the walls are painted, a pad comprising a plurality of identical masks, each mask comprising a substantially flat thin sheet having an outer perimeter of minimum geometric dimensions great enough to completely overlay a perimeter of an opening in the wall surrounding the box and of maximum geometric dimensions small enough to completely lie within a perimeter of the decorative plate when the plate has been located to cover the wall box and a raised portion of perimeter, depth and location suitable for receiving therein portions of the contents of the box which protrude from the box beyond a plane of a surface of the wall and means fixed to a face of said sheet along said outer perimeter for adhering a portion of said face of said sheet to the wall, said masks being temporarily held in stacked laminar relationship by said adhering means, said raised portions of said masks being tapered for nesting in said laminar relationship.

* * * * *